United States Patent [19]

von Blücher et al.

[11] Patent Number: 4,983,192

[45] Date of Patent: Jan. 8, 1991

[54] TEXTILE SHEET FILTER

[76] Inventors: Hubert von Blücher, Freytagstrasse 45; Hasso von Blücher, Sohnstrasse 58, both of D-400 Düsseldorf; Ernest de Ruiter, Höhenstrasse 57a, D-5090 Leverkusen 3, all of Fed. Rep. of Germany

[21] Appl. No.: 319,399

[22] Filed: Mar. 3, 1989

Related U.S. Application Data

[60] Division of Ser. No. 215,860, Jul. 6, 1988, abandoned, which is a continuation of Ser. No. 641,085, Aug. 15, 1984, abandoned, which is a continuation of Ser. No. 456,459, Jan. 7, 1983, abandoned.

[30] Foreign Application Priority Data

Jan. 14, 1982 [DE] Fed. Rep. of Germany ....... 3200959

[51] Int. Cl.$^5$ ................................................ B01D 53/04
[52] U.S. Cl. ...................................... 55/387; 55/524; 55/528; 55/DIG. 44; 428/87; 428/296
[58] Field of Search ................. 55/316, 387, 486, 524, 55/528, DIG. 43, DIG. 44; 210/505; 428/87, 283, 288, 296

[56] References Cited

U.S. PATENT DOCUMENTS

| | | | |
|---|---|---|---|
| 1,872,581 | 8/1932 | Haroldson | 428/87 |
| 3,015,367 | 1/1962 | Smith et al. | 55/387 |
| 3,220,915 | 11/1965 | Shannon | 55/524 |
| 3,697,347 | 10/1972 | Lehmann | 428/288 |
| 3,912,567 | 10/1975 | Schwartz | 428/288 |
| 3,998,988 | 12/1976 | Shimomai et al. | 428/400 |
| 4,132,650 | 1/1979 | Kirsch et al. | 210/505 |
| 4,160,059 | 7/1979 | Samejima | 55/316 |
| 4,188,960 | 2/1980 | Morie et al. | 55/524 |
| 4,201,838 | 5/1980 | Goldberg | 428/283 |
| 4,225,642 | 9/1980 | Hirakawa | 55/528 |
| 4,277,266 | 7/1981 | Dick | 55/524 |
| 4,285,748 | 8/1981 | Booker et al. | 428/288 |
| 4,376,675 | 3/1983 | Perrotta | 428/296 |
| 4,379,802 | 4/1983 | Weaver et al. | 428/283 |

FOREIGN PATENT DOCUMENTS

| | | | |
|---|---|---|---|
| 88225 | 7/1895 | Fed. Rep. of Germany | |
| 48851 | 12/1980 | Japan | 55/316 |
| 433186 | 8/1935 | United Kingdom | 55/524 |
| 2005016 | 4/1979 | United Kingdom | 55/387 |
| 2077141 | 12/1981 | United Kingdom | 55/387 |

*Primary Examiner*—Jay H. Woo
*Assistant Examiner*—C. Scott Bushey

[57] ABSTRACT

A sheet filter made up of a flat textile article carrying micrometric particles of a resistant and/or adsorptive additive, the textile article made up of fibers which upon heating become temporarily adhesive without fusing. Advantageously the textile article is a nonwoven fibrous fleece or a pile fabric; if a fleece, a second fleece can be placed over the additive particles so heating unites the fleeces as well as adhereing the particles.

1 Claim, No Drawings

TEXTILE SHEET FILTER

This is a division of application Ser. No. 215,860, filed July 6, 1988, now abandoned, which is a continuation of application Ser. No. 641,085, filed Aug. 15, 1984, now abandoned, which was a continuation of application Ser. No. 456,459, filed Jan. 7, 1983, now abandoned.

DESCRIPTION

The invention relates to a textile sheet filter made from a flat article which is supplied with micrometric substances of specific protective and/or adsorption properties as well as the process for manufacturing such a textile sheet filter.

Textile sheet filters with adsorption properties are currently being employed in the most diverse areas of technology, finding application in smoke filters for the kitchen, in air-conditioning units for buildings and vehicles, in face masks and in protective suit against toxic materials and even shoe linings.

There are basically two different types of sheet filters. A well-known type consists of a web fabric or fleece made of cellulose or PAN (Polyacryl Nitrile Fibers) fibers for instance, wherein the web or fleece is carbonized and subsequently activated. To be sure, a simple sheet filter is also highly active, however its durability is frequently insufficient and as a result the applicability of a simple filter would be limited. Therefore, one may design this type of sheet filter with a so-called "sandwich construction" embedded between two fleeces. Yet, the sheet filter's applicability is still limited, in this case, mostly to stationary implements. However in the manufacture of protective suits for example, sheet filters are becoming more necessary where heavy durability in addition to a degree of suppleness are required.

Sheet filters consisting of flexible, adsorption-sensitized supports such as webbing, fleece or foam rubber, are known to serve this function. In order to supply the support with substances of resistant and/or adsorption properties, a bonding agent is necessary for the purpose of binding the substance to the support. As a result, a considerable part of the support's pore volume is closed off, whereby the activity of the identical sheet filter is frequently insufficient and limited.

The purpose of the invention is to provide a textile sheet filter which exhibits marked flexibility and heavy durability in addition to outstanding activity. Therefore, it is completely applicable in the most varied functions, both stationary and mobile.

According to the invention itself, this is achieved by a textile sheet filter made of a flat article which is supplied with micrometric substances of specific resistant and/or adsorption properties, wherein the flat article comprises at least about 50% by weight of fiber and which becomes temporarily adhesive without fusing when the temperature rises.

A fibrous textile sheet filter in accordance with the invention becomes superficially adhesive without fusing when heated one or more times to elevated temperatures.

This inherent quality of the fibers, which may be designated as an internally fusible adhesive, can be utilized for the purpose of holding the filter's preferred micrometric substances of specific resistant and/or adsorption properties, wherein they adhere without any additional further bonding which on the one hand completely preserves the flexibility and durability of the article of flat surface area while simultaneously allowing the pore volume to remain high. As a result a sheet filter of outstanding activity is obtained.

For example, the type of fiber best suited is undrawn polyester. What characterizes these fibers is the fact that at between 80°–85° C. they become soft and adhesive without fusing, finally crystallizing when the temperature rises and hence having the thermal stability of a standard polyester fiber.

Less common flat fabrics which consist of heterofilaments Imperial Chemical Industries (ICI) are suitable, such as polyester, polyamides or polypropylene. These are fibers made of two concentrically-grouped components of which the outer one has a lower fusion point.

The manufacture of textile sheet filters according to the invention can take place in a number of ways. A voluminous, un-reinforced fleece of fine fibers has proven to be especially advantageous as a support. Fibers of about 1 to 10 dtex are particularly suitable for this purpose; coarser fibers are far less suitable. Initially the underside of the support may be reinforced or stabilized by contact heating whereby the stabilized support can subsequently be easily treated. A further advantage lies in the fact that the support's underside, so thickened subsequent to being supplied with the additives of specific resistant and/or adsorption properties, prevents falling-through of the additive. After being supplied with the appropriate material, the fleece is then reinforced thoroughly. With the adhesive properties of the fibers according to the invention, the micrometric substances not only adhere to the fibers but rather, are for the most part, embedded inside of the fibers.

As a variant in production, the fleece is initially reinforced on its underside, then supplied with the adsorbent as heretofore described, subsequently covered with a second layer of fleece of the same composition, and the laminated structure as a whole is united through the interaction of heat under slight pressure.

For example, a pile fabric can also be employed in the manufacture of a sheet filter. According to the invention, the underside consists of an infusible or difficultly fusible substance, for example cotton or an aramide or similar material, and the pile consists of a heterofilaments or undrawn polyester fiber. The pile is then loaded with additives of specific resistant and adsorption qualities and is then heated up under light pressure until it becomes adhesive.

In accordance with another embodiment the fabric surfaces may be sueded or roughened to promote adherence of the micrometric additives. Normally, the woof of the fabric comprises the temporarily adhesive fibers and these will be coarsened.

Textile supports containing flame-retardant additives can find application in special areas. In order to offer gentle protection against fragments or shell splinters, up to 50% of the fabric may consist of a tear-resistant aramide such as Kevlar (TM) Aramide Fiber.

Activated carbon is particularly suitable as the additive with specific resistant or adsorption properties, although other additives such as molecular sieves, ion exchangers or aluminum hydroxide can be employed. The particle size generally amounts to from 50 to 500 $\mu$m and especially 100 to 200 $\mu$m. The weight of the additive relative to the textile support can vary widely, the preferred figure falling between 10 and 300% and particularly 50 to 200%.

The following examples will serve to illustrate the invention:

EXAMPLE 1

A non-reinforced voluminous needled fleece made of heterofilament polyester fibers with a titer of 2 dtex and a weight of 100 g/m$^2$ (ICI-fibers) was reinforced by contact heating at 190° C. Subsequently the fibrous material was loaded with twice its weight of activated carbon granules of 0.2 mm average diameter and subsequently reinforced under slight pressure. The sheet filter so produced exhibited outstanding activity with good mechanical properties, a activated carbon being firmly encased within the support.

EXAMPLE 2

A web made a heterofil polyamide fiber, weighing approximately 150 g/m$^2$, was used as a support. The web was roughened on one side and it was subsequently loaded with 80% its weight of activated carbon in addition to being heated by contact heating at 190° C., under slight pressure, to the fusion point of the formed nap covering. As a result, the activated carbon was firmly encased within the roughened web. The resulting sheet filter exhibited a high degree of activity along with good mechanical properties.

EXAMPLE 3

A pile fabric with a base made of cotton and a pile made of undrawn polyester fiber "(DIOLEN 51 TM)", was used as support. Subsequently powdered activated carbon was applied to the pile and the fabric was heated to about 120° C. while under slight pressure. Following removal of excess activated carbon, each of the fibers in the pile was covered with activated carbon and the resulting sheet filter exhibited outstanding activity along with desirable mechanical properties and flexibility.

EXAMPLE 4

The process of Example 1 was repeated except that the additive was not activated carbon but rather was a blend of 150 parts by weight of activated carbon and 50 parts by weight of about 100 $\mu$m Al(OH)$_3$, relative to 100 parts of the fleece weight.

It is understood that the specification and examples are illustrative but not limitative of the present invention and that other embodiments within the spirit and scope of the invention will suggest themselves to those skilled in the art.

We claim:

1. A sheet filter comprising a pile fabric carrying micrometric particles of activated carbon, the base of the pile fabric comprising fusion-resistant fibers and the pile of the fabric comprising fusible fibers, the fusible fibers comprising undrawn amorphous polyester fibers which upon heating to about 80° to 85° C. become temporarily adhesive without fusing, the fabric having been heated under pressure thereby to secure the carbon particles to the pile.

* * * * *